106-90

EXAMINER

5○

United States Patent Office 2,816,043
Patented Dec. 10, 1957

2,816,043

HYDRAULIC CEMENT WITH RETARDED SETTING ACTION

Jan van Heiningen and Gerrit J. Harmsen, Amsterdam, Netherlands, assignors to Shell Development Company, New York, N. Y., a corporation of Delaware No Drawing. Application May 24, 1954,
Serial No. 432,018

Claims priority, application Netherlands
September 22, 1953

5 Claims. (Cl. 106—90)

The present invention relates to a method of cementing wells and pertains more particularly to a hydraulic cement composition having a retarded setting action for use in cementing deep or high-temperature wells.

It is sometimes desirable to retard the setting of the cement slurry. This is particularly true in the field of well drilling where it is common to cement the boreholes of oil and gas wells at depths greater than 8,000 feet. The greater the depths at which a cementation is to be carried out, the longer the time revuired to pump the cement to its proper location within the borehole. Also, high temperatures are encountered in deep well boreholes which generally accelerate the setting time of cements.

Thus, when borehole cementations are carried out at a depth between 8,000 and 14,000 feet, borehole temperatures in the range of 150-170° C. may be expected and the time required for a cement slurry to be pumped to that depth may be in the vicinity of 120 minutes, said time being also dependent upon the quantity of cement to be pumped and the capacity of pumps being used. It is therefore obvious that borehole cementations of deep wells must be carried out with a cement composition possessing slow setting characteristics whereby the cement may be pumped for extended periods of time at elevated temperatures without setting.

For purposes of comparison made hereinbelow, it may be mentioned at this time that the temperature of a well at a 6,000 foot depth is generally about 90° C. and that at a temperature of 150° C., cement sets from 2 to 4 times master than at a temperature of 90° C.

While cements having a retarded setting action are particularly useful in cementing deep boreholes, it may sometimes be advantageous to use a slow set cement slurry in shallow wells or at shallower depths in the deep boreholes, for instance, when a cementation has to be carried out slowly or requires more than the normal time, owing to technical conditions or operational difficulties. As the setting of the cement slurry must not begin before it has arrived at its destination, care must be taken to insure that setting does not commence previously.

When reference is made hereinbelow to the setting of the cement slurry, it is to be understood that this refers to the moment at which the so-called "initial setting" commences. When cement and water are mixed, the setting or stiffening of the mixture will at first be very gradual, but will rapidly accelerate at a certain moment which is called "the moment of initial setting." This moment practically corresponds to the limit of pumpability, that is, that moment after which the cement cannot be pumped. The setting moment is determined by a Vicat apparatus.

It is known to prepare a cement slurry having a retarded setting action by adding various kinds of materials to the cement used. Such an addition usually has one or more of the following disadvantages. The retarding effect of the added material may be insufficient, or, on the other hand, it may be excessive; the retarding action is not easily adjustable, or it greatly depends on the quantity of material added or is confined to certain types of cement; the added materials often cause the slurry to foam, or they are not sufficiently stable; after hardening, the cement is found to have little strength.

Although some materials have been added to cements which have been found to be free of these disadvantages, such for example as certain synthetic resins, oxidized paraffin wax and shellac, which give excellent results, it has been found that their use in actual borehole cementing operations involved considerable difficulties. In practice, the cement and the set-retarding additive are added through a hopper to a stream of mixing water, and the resultant slurry is immediately pumped into a well. Mixing a cement and an additive in this manner, however, often results in a cement slurry wherein the added set retarding material has not been homogeneously distributed. This is also true when the set retarding additive and the cement are added to the mixing liquid through two separate hoppers. Thus, although the addition of certain set retarding solid substances to the cement slurry theoretically results in a satisfactory product, considerable operational difficulties are encountered in homogeneously mixing the two materials.

It is, therefore, a primary object of this invention to provide a set retarding material for cement which may be readily mixed with cement to obtain a homogeneous cement slurry having a retarded setting action.

It is also an object of this invention to provide a cement slurry incorporating a set retarding agent, said cement slurry exhibiting no tendency to foam and being substantially stable at all times.

A further object of the present invention is to provide a cement slurry of high strength which possesses a retarded setting action, at all times, even when exposed to high temperatures.

These and other objects of this invention will be understood from the following description of the invention.

The present invention is predicated upon the discovery that the setting time of a cement slurry can be retarded without affecting adversely the strength of the resulting cement by preparing the cement slurry with a mixing liquid consisting mostly of water admixed with a minor portion of an inert liquid, that is, of a liquid which does not react with the cement to any considerable extent. In accordance with this invention, a hydraulic cement is prepared by admixing the cement with an aqueous base liquid containing at least 5% and preferably not less than 10% of an inert water-miscible organic liquid. Other inert materials, such as sand, gravel, etc., may be added to the mixture.

The maximum amount of this organic liquid in the mixing liquid is determined mainly by the strength desired in the resultant hardened cement. Generally not more than approximately 30% organic liquid is incorporated in the mixing liquid. Examples of suitable organic liquids are methyl alcohol, ethyl alcohol, propanol-2, isopropyl alcohol, and diacetone alcohol. Mixtures of these organic liquids may also be used.

For example, by substituting 20% of the mixing water with methyl alcohol or ethyl alcohol, a setting time can be obtained which is approximately three to two times as long as that when only water is used as a mixing liquid. By admixing a water-miscible, aliphatic monohydric alcohol as a set-retarding agent to the water used in preparing a cement slurry, the set-retarding alcohol is homogeneously mixed throughout the cement slurry. These alcohols form stable set-retarding agents which may be readily added without causing any foaming during the mixing of the cement slurry. The quantities in which these set-retarding agents are to be used depend upon the amount by which it is desired to retard the setting of cement. This in turn depends upon various factors, such as the depth and temperature of the well, depth at which the cement is to be placed, pump capacity, etc.

Preferably, the organic liquid chosen as the set-retarding agent should be water-miscible in any proportions, but it will suffice to use an organic liquid which is completely miscible with water in the proportions desired for the particular cementing job and at the temperature at which the mixing is to take place. Since the organic liquid must behave in an inert or practically inert manner toward the cement, liquids such as organic acids, esters, glycol and glycerol are unsuitable. As stated above, this invention is concerned mainly with the use of organic liquid set-retarding agents consisting essentially of water-miscible aliphatic monohydric alcohols and, to be more specific, with unsubstituted aliphatic alcohols having no ether linkages. This invention does not contemplate the use of ether alcohols within its scope. The invention is illustrated by the examples which follow.

EXAMPLE I

Cement slurries were prepared by mixing two different types of Portland cement and two different types of blast furnace cement with mixing water which contained 0%, 7%, 15%, 20% and 25% ethanol. The setting time was measured in minutes up to the moment of initial setting (see Table I). The compressive strength of the hardened cement (in kg./sq. cm.) was measured after 1 day, and after 10 days in the case of those tests in which mixing water containing 20% ethanol was used (see Table II). The temperature during the tests was 90° C.; the weight ratio of mixing liquid to cement was 0.4. In all cases, the strength of the hardened cements remained well above the minimum value required for the desired application in well drilling operations which may be taken to be approximately 100 kg. per sq. cm.

Table I

| Percent Ethanol in Mixing Liquid | Portland Cement I | Portland Cement II | Blast Furnace Cement I | Blast Furnace Cement II |
|---|---|---|---|---|
| | Setting Time in Minutes | | | |
| 0 | 70 | 70 | 50 | 65 |
| 7 | 90 | 110 | 85 | 135 |
| 15 | 140 | 150 | 150 | 240 |
| 20 | 185 | 170 | 190 | 290 |
| 25 | 230 | 165 | 240 | 405 |

Table II

| | Compressive Strength in kg./sq. cm. | |
|---|---|---|
| | After 1 Day | After 10 Days |
| Portland Cement I | 140 | 205 |
| Portland Cement II | 210 | 205 |
| Blast Furnace Cement I | 190 | 250 |
| Blast Furnace Cement II | 295 | 315 |

The results show that the retarding period is of the desired order of magnitude, and gradually increases in proportion to the quantity of alcohol added, the effect being adequate with all types of cement.

EXAMPLE II

Tests similar to those described in Example I were carried out with four different ore cements and a blast furnace cement. The amount of ethanol used in the mixing water was 0%, 7% (only with blast furnace cement and ore cement I), 15% and 20%.

The tests were carried out at 150° C.

Table III

| Percent Ethanol in Mixing Liquid | Cement I | Cement II | Cement III | Cement IV | Blast Furnace Cement |
|---|---|---|---|---|---|
| | Setting Time in Minutes | | | | |
| 0 | 70 | 105 | 90 | 100 | 45 |
| 7 | 90 | | | | 110 |
| 15 | 125 | 195 | 185 | 185 | 185 |
| 20 | 150 | 245 | 215 | 215 | 270 |

EXAMPLE III

The effect of various organic liquids on the moment of initial setting is seen from the results (see Table IV) of the following tests carried out with another blast furnace cement (but similar to that used in Example II). The mixing liquid contained in each case 20% of the organic liquid and the weight ratio of mixing liquid to cement was 0.4. Tests were carried out at 150° C. and the setting time was measured in minutes.

Table IV

| Organic Liquid | Setting Time Minutes |
|---|---|
| Blank | 65 |
| Methanol | 225 |
| Ethanol | 185 |
| Propanol-2 | 175 |
| Diacetone alcohol | 205 |

In general, blast furnace cements are retarded more than Portland cements. The fact that the setting time of slow-set and retarded cements can be further lengthened by a factor of 2 or more is important as their range of applicability in cementing deep wells is considerably extended and the safety of their use increased.

An important feature of the retarding of cements by the addition of organic liquid is that the setting times are increased approximately in proportion to concentrations of the organic liquid. Thus, it may be seen that the present retarded cement slurries exhibit only slight variations in setting time with small changes in the amount of organic fluid used. This slight sensitivity on the part of cements to the addition of organic fluids to the mixing liquid is considered to be a desirable feature with regard to their applicability to well cementing operations.

The addition of alcohols to the cement slurries does not affect adversely the "water loss" of the slurries and the soundness of the hardened cement, the "water loss" being even slightly improved in most cases.

We claim as our invention:

1. A pumpable hydraulic cement slurry having a retarded action at temperatures above atmospheric, consisting essentially of hydraulic cement, an aqueous liquid consisting of from 95% to about 70% water, and from 5% to about 30% by volume of liquid of an inert water-miscible aliphatic monohydric alcohol.

2. A pumpable hydraulic cement slurry having a retarded action at temperatures above atmospheric, consisting essentially of a hydraulic cement, an aqueous liquid consisting of from 95% to about 70% water, and from 5% to about 30% by volume of liquid of methyl alcohol.

3. A pumpable hydraulic cement slurry having a retarded action at temperatures above atmospheric, consisting essentially of a hydraulic cement, an aqueous liquid consisting of from 95% to about 70% water, and from 5% to about 30% by volume of liquid of ethyl alcohol.

4. A pumpable hydraulic cement slurry having a retarded action at temperatures above atmospheric, consisting essentially of a hydraulic cement, an aqueous liquid consisting of from 95% to about 70% water, and from 5% to about 30% by volume of liquid of propanol-2.

5. A pumpable hydraulic cement slurry having a retarded action at temperatures above atmospheric, consisting essentially of a hydraulic cement, an aqueous liquid consisting of from 95% to about 70% water, and from 5% to about 30% by volume of liquid of diacetone alcohol.

References Cited in the file of this patent

UNITED STATES PATENTS

| 1,112,725 | Schofer | Oct. 6, 1914 |
| 1,998,667 | Mauer | Apr. 23, 1935 |
| 2,238,540 | Sourwine | Apr. 15, 1941 |
| 2,576,955 | Ludwig | Dec. 4, 1951 |

FOREIGN PATENTS

| 853,413 | Germany | 1952 |